(12) United States Patent
Tanaka et al.

(10) Patent No.: US 8,724,501 B2
(45) Date of Patent: May 13, 2014

(54) MOBILE COMMUNICATION TERMINAL TEST DEVICE AND MOBILE COMMUNICATION TERMINAL TEST METHOD

(75) Inventors: Junya Tanaka, Atsugi (JP); Yasuyuki Matsuyama, Atsugi (JP); Takuma Goto, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 89 days.

(21) Appl. No.: 13/531,851

(22) Filed: Jun. 25, 2012

(65) Prior Publication Data

US 2013/0003598 A1 Jan. 3, 2013

(30) Foreign Application Priority Data

Jun. 29, 2011 (JP) .................. 2011-144518

(51) Int. Cl.
*G06F 11/32* (2006.01)
(52) U.S. Cl.
USPC ....... 370/252; 370/328; 455/67.7; 455/115.4; 455/226.4
(58) Field of Classification Search
None
See application file for complete search history.

(56) References Cited

U.S. PATENT DOCUMENTS

| 7,190,978 | B2 | 3/2007 | Saikyo et al. | |
|---|---|---|---|---|
| 8,483,086 | B2 * | 7/2013 | Nimbalker et al. | 370/252 |
| 8,488,692 | B2 * | 7/2013 | Imamura et al. | 375/260 |
| 2004/0097240 | A1 * | 5/2004 | Chen et al. | 455/450 |
| 2010/0075672 | A1 * | 3/2010 | Jwa et al. | 455/434 |
| 2012/0108250 | A1 * | 5/2012 | Ahn et al. | 455/450 |

FOREIGN PATENT DOCUMENTS

JP 2010-119065 A 5/2010

OTHER PUBLICATIONS

3rd Generation Partnership Project; Technical Specification Group Radio Access Network; Evolved Universal Terrestrial Radio Access (E-UTRA); Physical layer procedures (Release 8) 3GPP TS 36.213 v8.7.0 (May 2009).

* cited by examiner

*Primary Examiner* — Alex Skripnikov
(74) *Attorney, Agent, or Firm* — Pearne & Gordon LLP

(57) ABSTRACT

To provide a mobile communication terminal test device and a mobile communication terminal test method capable of displaying the theoretical value of a packet transmission rate. A mobile communication terminal test device 1 includes a pseudo base station device 10 that is connected between a mobile communication terminal 5, which is a test target, and a virtual connection device 20, a table storage device 30 that stores various tables, a parameter input unit 50 that inputs information about TM, MCS, and NRB, a TBS acquiring unit 41 that acquires TBS on the basis of the input information and various tables stored in the table storage device 30, a packet transmission rate calculating unit 43 that calculates the theoretical value of the packet transmission rate from TBS, and a display unit 93 that displays the theoretical value of the packet transmission rate.

10 Claims, 8 Drawing Sheets

(a) Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

(b) Modulation, TBS index and redundancy version table for PUSCH

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 4 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

FIG. 2

Transport block size table

| $I_{TBS}$ | NRB | | | | | | |
|---|---|---|---|---|---|---|---|
| | 1 | 2 | ------ | 100 | ------ | 109 | 110 |
| 0 | 16 | 32 | ------ | 2729 | ------ | 2984 | 3112 |
| 1 | 24 | 56 | ------ | 3624 | ------ | 4008 | 4008 |
| ⋮ | ⋮ | ⋮ | ------ | ⋮ | ⋮ | ⋮ | ⋮ |
| 21 | 488 | 1000 | ------ | 51024 | ------ | 55056 | 55056 |
| ⋮ | ⋮ | ⋮ | ------ | ⋮ | ⋮ | ⋮ | ⋮ |
| 25 | 616 | 1256 | ------ | 63776 | ------ | 68808 | 71112 |
| 26 | 712 | 1480 | ------ | 75376 | ------ | 75376 | 75376 |

FIG. 3

One-layer to two-layer TBS translation table

| TBS L1 | TBS L2 |
|---|---|
| 1544 | 3112 |
| 1608 | 3240 |
| ⋮ | ⋮ |
| 51024 | 101840 |
| ⋮ | ⋮ |
| 73712 | 146856 |
| 75376 | 149776 |

FIG. 4

Transmission bandwidth configuration $N_{RB}$ in E- UTRA channel bandwidths

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

(a) Downlink physical layer parameter values set by the field ue-Category

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |

(b) Uplink physical layer parameter values set by the field ue-Category

| UE Category | Maximum number of bits of an UL-SCH transport block transmitted within a TTI | Support for 64QAM in UL |
|---|---|---|
| Category 1 | 5160 | No |
| Category 2 | 25456 | No |
| Category 3 | 51024 | No |
| Category 4 | 51024 | No |
| Category 5 | 75376 | Yes |

FIG. 10

MOBILE COMMUNICATION TERMINAL TEST DEVICE AND MOBILE COMMUNICATION TERMINAL TEST METHOD

TECHNICAL FIELD

The present invention relates to a mobile communication terminal test device and a mobile communication terminal test method which test mobile communication terminals, such as mobile phones or mobile terminals.

BACKGROUND ART

For example, Patent Document 1 discloses this type of mobile communication terminal test device. The mobile communication terminal test device includes a pseudo base station unit that is provided between a mobile communication terminal, which is a test target, and a plurality of connection destinations which can be connected to the mobile communication terminal, and a sequence display unit and a communication state display unit that display a communication sequence and a communication state between one of the plurality of connection destinations and the mobile communication terminal, respectively. According to this structure, the mobile communication terminal test device according to the related art disclosed in Patent Document 1 makes it possible for the tester to check the connection state between the mobile communication terminal and the connection destination with ease.

RELATED ART DOCUMENT

Patent Document

[Patent Document 1] JP-A-2006-50567 (Family U.S. Pat. No. 7,190,978B2 and Family Chinese Patent No. 100399753)

DISCLOSURE OF THE INVENTION

Problem that the Invention is to Solve

However, in Patent Document 1, W-CDMA (Wideband-Code Division Multiple Access), which is a third-generation communication system (3G), is given as an example. This system has communication speeds higher than that of, for example, the second-generation GPRS (General Packet Radio Service). In recent years, as the next-generation communication standard of W-CDMA, a communication standard called 3GPP (Third Generation Partnership Project) LTE (Long Term Evolution) has been examined and has started to be introduced.

In LTE, OFDMA (Orthogonal Frequency Division Multiple Access) is used in the downlink and SC-FDMA (Single Carrier-Frequency Division Multiple Access) is used in the uplink.

In LTE, a modulation and coding scheme (MCS) and the number of resource blocks (NRB) are determined according to transmission path conditions.

Here, attention is paid to the packet transmission rate in each communication system. First, in GPRS, the theoretical maximum value of the packet transmission rate is represented by the product of a channel CS (Channel Coding Scheme) and the number of slots. The maximum theoretical value of the packet transmission rate in W-CDMA is 384 kbps in Release 99 and is 5.76 Mbps and 14.4 Mbps in the uplink and downlink in HSPA, respectively. Therefore, when the mobile communication terminal test device according to the related art tests a mobile communication terminal using GPRS or W-CDMA, the tester can check the packet transmission rate in each communication system. Therefore, it is not necessary to display the packet transmission rate during the test.

However, as described above, when the mobile communication terminal is tested using a communication system in which MCS and NRB are determined according to transmission path conditions, the packet transmission rate varies depending on the transmission path conditions. As a result, in the mobile communication terminal test device according to the related art, it is difficult for the tester to check the packet transmission rate. Therefore, a device capable of displaying the maximum theoretical value of the packet transmission rate (hereinafter, referred to as the "theoretical value of the packet transmission rate") is desirable.

The present invention has been made in view of the above-mentioned problems and an object of the invention is to provide a mobile communication terminal test device and a mobile communication terminal test method capable of displaying the theoretical value of the packet transmission rate.

Means for Solving Problem

According to an aspect of the invention, there is provided a mobile communication terminal test device (1, 2) that tests a mobile communication terminal (5) which performs communication using a communication system in which a modulation and coding scheme (MCS) and the number of resource blocks (NRB) determined according to transmission path conditions and a transmission mode (TM) indicating a predetermined packet transmission operation mode are prescribed. The mobile communication terminal test device includes: modulation and coding scheme information acquiring means (52, 73) for acquiring information about the modulation and coding scheme; resource block number information acquiring means (53, 71) for acquiring information about the number of resource blocks; transmission mode information acquiring means (51) for acquiring information about the transmission mode; transport block size acquiring means (41) for acquiring a maximum transport block size (TBS) which can be transmitted per unit time from the information about the modulation and coding scheme, the information about the number of resource blocks, and the information about the transmission mode; packet transmission rate calculating means (43) for calculating a theoretical value of a packet transmission rate from the transport block size; and packet transmission rate display means (93) for displaying the theoretical value of the packet transmission rate.

According to this structure, the mobile communication terminal test device according to the above-mentioned aspect of the invention calculates the theoretical value of the packet transmission rate on the basis of each information item and displays the theoretical value on the packet transmission rate display means. Therefore, it is possible to display the theoretical value of the packet transmission rate.

The mobile communication terminal test device according to the above-mentioned aspect may further include: test condition input means (91, 95) for inputting test conditions including the information about the modulation and coding scheme, the information about the number of resource blocks, and the information about the transmission mode; and table storage means (30) for storing a transport block size table (32) indicating a correspondence between the modulation and coding scheme and the transport block size. The modulation and coding scheme information acquiring means, the resource block number information acquiring means, and the transmission mode information acquiring means may acquire the information about the modulation and coding scheme, the information about the number of resource blocks, and the information about the transmission mode which are input by the test condition input means, respectively. The transport block size acquiring means may acquire the transport block size from the information about the modulation and coding scheme, the information about the number of resource blocks, and the information about the transmission mode which are input by the test condition input means, and the transport block size table.

According to this structure, the mobile communication terminal test device according to the above-mentioned aspect of the invention calculates the theoretical value of the packet transmission rate on the basis of the information about the modulation and coding scheme, the information about the number of resource blocks, and the information about the transmission mode and displays the theoretical value on the packet transmission rate display means. Therefore, it is possible to display the theoretical value of the packet transmission rate.

The mobile communication terminal test device according to the above-mentioned aspect may further include test scenario storage means (94) for storing a test scenario which is a test sequence for testing the mobile communication terminal. The test condition input means (95) extracts the information about the modulation and coding scheme, the information about the number of resource blocks, and the information about the transmission mode from the test scenario stored in the test scenario storage means.

The mobile communication terminal test device according to the above-mentioned aspect may further include: test condition input means (91, 95) for inputting test conditions including information about a communication bandwidth (BW) of the mobile communication terminal and information about the transmission mode; terminal category information acquiring means (72) for acquiring terminal category information indicating the communication capability of the mobile communication terminal from the mobile communication terminal; and table storage means (60) for storing a transport block size table (32) indicating a correspondence between the modulation and coding scheme and the transport block size. The transmission mode information acquiring means may acquire the information about the transmission mode input by the test condition input means. The modulation and coding scheme information acquiring means may acquire the information about the modulation and coding scheme on the basis of the smaller of the maximum number of transport blocks acquired in the communication bandwidth and the maximum number of transport blocks acquired in the terminal category. The transport block size acquiring means may acquire the transport block size on the basis of the information about the modulation and coding scheme acquired by the modulation and coding scheme information acquiring means and the transport block size table.

According to this structure, the mobile communication terminal test device according to the above-mentioned aspect of the invention calculates the theoretical value of the packet transmission rate on the basis of the information about the communication bandwidth of the mobile communication terminal and the information about the transmission mode and displays the theoretical value on the packet transmission rate display means. Therefore, it is possible to display the theoretical value of the packet transmission rate.

The mobile communication terminal test device according to the above-mentioned aspect may further include test scenario storage means (94) for storing a test scenario which is a test sequence for testing the mobile communication terminal. The test condition input means (95) may extract the information about the communication bandwidth and the information about the transmission mode from the test scenario stored in the test scenario storage means.

According to another aspect of the invention, there is provided a mobile communication terminal test method that tests a mobile communication terminal (5) which performs communication using a communication system in which a modulation and coding scheme (MCS) and the number of resource blocks (NRB) determined according to transmission path conditions and a transmission mode (TM) indicating a predetermined packet transmission operation mode are prescribed. The mobile communication terminal test method includes: a modulation and coding scheme information acquiring step (S11, S25) of acquiring information about the modulation and coding scheme; a resource block number information acquiring step (S11, S22) of acquiring information about the number of resource blocks; a transmission mode information acquiring step (S11, S21) of acquiring information about the transmission mode; a transport block size acquiring step (S13, S26) of acquiring a maximum transport block size (TBS) which can be transmitted per unit time from the information about the modulation and coding scheme, the information about the number of resource blocks, and the information about the transmission mode; a packet transmission rate calculating step (S16) of calculating a theoretical value of a packet transmission rate from the transport block size; and a packet transmission rate display step (S17) of displaying the theoretical value of the packet transmission rate.

According to this structure, the mobile communication terminal test method according to the above-mentioned aspect of the invention calculates the theoretical value of the packet transmission rate on the basis of each information item and displays the theoretical value in the packet transmission rate display step. Therefore, it is possible to display the theoretical value of the packet transmission rate.

The mobile communication terminal test method according to the above-mentioned aspect may further include a test condition input step (S11) of inputting test conditions including the information about the modulation and coding scheme, the information about the number of resource blocks, and the information about the transmission mode. The modulation and coding scheme information acquiring step, the resource block number information acquiring step, and the transmission mode information acquiring step may acquire the information about the modulation and coding scheme, the information about the number of resource blocks, and the information about the transmission mode which are input in the test condition input step, respectively. The transport block size acquiring step may acquire the transport block size from the information about the modulation and coding scheme, the information about the number of resource blocks, and the information about the transmission mode which are input in the test condition input step, and a transport block size table indicating a correspondence between the modulation and coding scheme and the transport block size.

According to this structure, the mobile communication terminal test method according to the above-mentioned aspect of the invention calculates the theoretical value of the packet transmission rate on the basis of the information about the modulation and coding scheme, the information about the number of resource blocks, and the information about the transmission mode and displays the theoretical value in the packet transmission rate display step. Therefore, it is possible to display the theoretical value of the packet transmission rate.

The mobile communication terminal test method according to the above-mentioned aspect may further include a test scenario storage step of storing a test scenario which is a test sequence for testing the mobile communication terminal. The test condition input step may extract the information about the modulation and coding scheme, the information about the number of resource blocks, and the information about the transmission mode from the stored test scenario.

The mobile communication terminal test method according to the above-mentioned aspect may further include: a test condition input step (S21) of inputting test conditions including information about a communication bandwidth (BW) of the mobile communication terminal and the information about the transmission mode; and a terminal category information acquiring step (S23) of acquiring terminal category information indicating the communication capability of the mobile communication terminal from the mobile communication terminal. The transmission mode information acquiring step may acquire the information about the transmission mode input in the test condition input step. The modulation and coding scheme information acquiring step may acquire the information about the modulation and coding scheme on the basis of the smaller of the maximum number of transport blocks acquired in the communication bandwidth and the maximum number of transport blocks acquired in the terminal category. The transport block size acquiring step may acquire the transport block size on the basis of the information about the modulation and coding scheme acquired in the modulation and coding scheme information acquiring step and a transport block size table indicating a correspondence between the modulation and coding scheme and the transport block size.

According to this structure, the mobile communication terminal test method according to the above-mentioned aspect of the invention calculates the theoretical value of the packet transmission rate on the basis of the information about the communication bandwidth of the mobile communication terminal and the information about the transmission mode and displays the theoretical value in the packet transmission rate display step. Therefore, it is possible to display the theoretical value of the packet transmission rate.

The mobile communication terminal test device according to the above-mentioned aspect may further include a test scenario storage step of storing a test scenario which is a test sequence for testing the mobile communication terminal. The test condition input step may extract the information about the communication bandwidth and the information about the transmission mode from the stored test scenario.

Advantage of the Invention

The invention can provide a mobile communication terminal test device and a mobile communication terminal test method capable of displaying the theoretical value of the packet transmission rate.

BRIEF DESCRIPTION OF THE DRAWINGS

FIG. 2 is a diagram illustrating the correspondence between $I_{MCS}$ and $I_{TBS}$ in the downlink and uplink in the mobile communication terminal test device according to the first embodiment of the invention.

FIG. 3 is a diagram illustrating a TBS table in the mobile communication terminal test device according to the first embodiment of the invention.

FIG. 4 is a diagram illustrating a TBS conversion table in the mobile communication terminal test device according to the first embodiment of the invention.

FIG. 10 is a diagram illustrating a UE category table in the mobile communication terminal test device according to the second embodiment of the invention.

BEST MODE FOR CARRYING OUT THE INVENTION

Hereinafter, exemplary embodiments of the invention will be described with reference to the accompanying drawings.

First Embodiment

First, the structure of a mobile communication terminal test device according to a first embodiment of the invention will be described.

Figure 1:
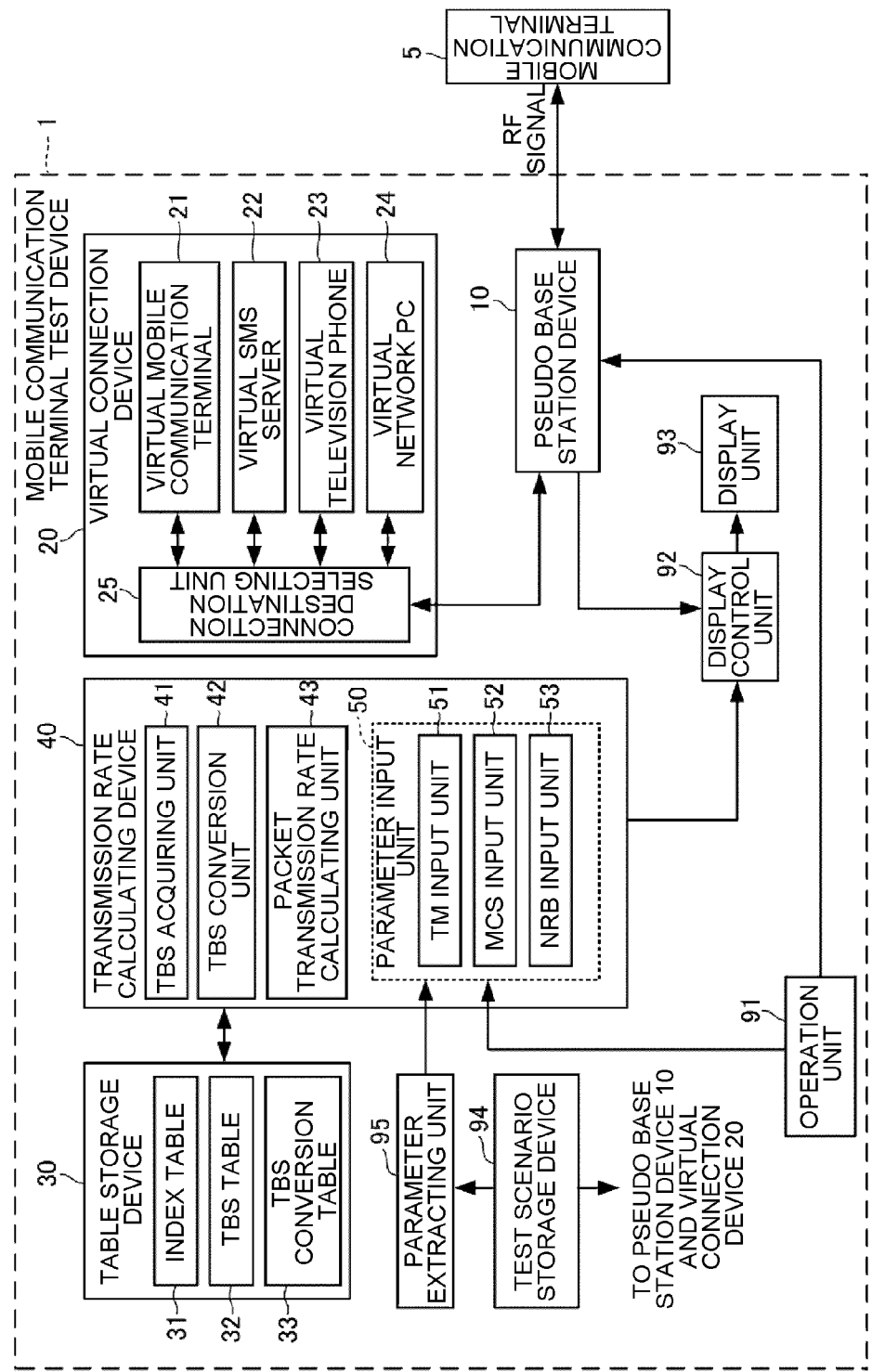
FIG. 1 is a block diagram illustrating the structure of a mobile communication terminal test device according to a first embodiment of the invention.

As shown in FIG. 1, a mobile communication terminal test device 1 according to this embodiment tests a mobile communication terminal 5 and includes a pseudo base station device 10, a virtual connection device 20, a table storage device 30, a transmission rate calculating device 40, an operation unit 91, a display control unit 92, a display unit 93, a test scenario storage device 94, and a parameter extracting unit 95. The mobile communication terminal test device 1 is, for example, a computer including a CPU, a ROM, a RAM, an HDD, and an interface.

In the following description, it is assumed that the pseudo base station device 10 uses 3GPP LTE as a communication standard in communication with the mobile communication terminal 5. As described above, in LTE, a modulation and coding scheme (MCS) and the number of resource blocks (NRB) are determined according to transmission path conditions and a transmission mode (TM) indicating a packet transmission operation mode is designated to perform communication. In this embodiment, an aspect in which the tester inputs information about MCS, NRB, and TM to the mobile communication terminal test device 1 and tests the mobile communication terminal 5 will be described.

The pseudo base station device 10 transmits and receives signals between the mobile communication terminal 5, which is a test target, and the virtual connection device 20 and simulates a base station. Although not shown in the drawings, the pseudo base station device 10 includes, for example, a transmitting unit that transmits packets to the mobile communication terminal 5 or the virtual connection device 20, a receiving unit that receives packets from the mobile communication terminal 5 or the virtual connection device 20, and a control unit that controls the transmission and reception of packets.

The virtual connection device 20 includes a virtual mobile communication terminal 21, a virtual SMS (Short Message Service) server 22, a virtual television phone 23, a virtual network PC 24, and a connection destination selecting unit 25. The connection destination selecting unit 25 selects a virtual connection destination on the basis of a selection signal transmitted from the operation unit 91 through the pseudo base station device 10. In this embodiment, it is assumed that the connection destination selecting unit 25 selects the virtual mobile communication terminal 21.

The table storage device 30 stores an index table 31, a TBS (Transport Block Size) table 32, and a TBS conversion table 33. The TBS indicates the number of information bits which can be transmitted while satisfying a predetermined packet error rate for the overall bandwidth. The table storage device 30 forms table storage means according to the invention.

The index table 31 is created in advance and indicates the correspondence between an index ($I_{MCS}$) indicating MCS and a TBS index ($I_{TBS}$) which is prepared in advance in order to calculate TBS. The index table 31 is described in the technical specification "3GPP TS 36.213" and is shown in FIG. 2.

FIG. 2(*a*) and FIG. 2(*b*) show the correspondence between $I_{MCS}$ and $I_{TBS}$ in the downlink and uplink, respectively. For example, in FIG. 2(*a*), $I_{TBS}$=18 corresponds to $I_{MCS}$=20. In FIG. 2(*a*), Qm=6 described between $I_{TBS}$=18 and $I_{MCS}$=20 indicates that the modulation system is 64QAM (Quadrature Amplitude Modulation). In addition, Qm=2 indicates QPSK (Quadrature Phase Shift Keying) and Qm=4 indicates 16QAM.

The TBS table 32 is created by calculating the correspondence between $I_{TBS}$ and NRB in TM1 or TM2 in advance. TM1 indicates the reception mode when one antenna is used and TM2 indicates the reception mode by diversity when two antennas are used in the MIMO (Multiple Input Multiple Output) technique. The TBS table 32 is shown in FIG. 3. The TBS table 32 forms a transport block size table according to the invention.

As shown in FIG. 3, the TBS table 32 indicates the maximum number of bits which can be transmitted at a frame interval of 10 milliseconds in the range of $I_{TBS}$s 0 to 26 and the range of NRBs 1 to 110. For example, when $I_{TBS}$ is 25 and NRB is 109, the maximum number of bits which can be transmitted at a frame interval of 10 milliseconds is 68808 bits.

In the TBS conversion table 33, the corresponding values of TBS between TM1 or TM2 and TM3 in the downlink are associated with each other. TM3 indicates the reception mode by spatial multiplexing when two antennas are used in the MIMO technique. The TBS conversion table 33 is described in the technical specification "3GPP TS 36.213" and is shown in FIG. 4.

As shown in FIG. 4, the TBS conversion table 33 indicates the correspondence between TBS (TBSL1) in TM1 or TM2 and TBS (TBSL2) in TM3. For example, TBSL2=146856 bits corresponds to TBSL1=73712 bits.

The transmission rate calculating device 40 includes a TBS acquiring unit 41, a TBS conversion unit 42, a packet transmission rate calculating unit 43, and a parameter input unit 50.

The parameter input unit 50 inputs each parameter for calculating the packet transmission rate from the operation unit 91 and includes a TM input unit 51 that inputs TM information, an MCS input unit 52 that inputs MCS information, and an NRB input unit 53 that inputs NRB information.

The TBS acquiring unit 41 acquires TBS in TM1 or TM2 on the basis of the MCS information acquired by the MCS input unit 52 and the NRB information acquired by the NRB input unit 53. The TBS acquiring unit 41 forms transport block size acquiring means according to the invention.

The TBS conversion unit 42 calculates TBS in TM3 with reference to the TBS conversion table 33.

The packet transmission rate calculating unit 43 calculates the theoretical value of the packet transmission rate on the basis of TBS in TM1 or TM2, or TBS in TM3. The packet transmission rate calculating unit 43 forms packet transmission rate calculating means according to the invention.

The operation unit 91 is operated by the tester and includes an input device, such as a keyboard, a dial, or a mouse, and a control circuit that controls them in order to input test conditions in the uplink or downlink, settings related to a test sequence, and each information item input by the parameter input unit 50. The operation unit 91 forms test condition input means according to the invention.

The display control unit 92 performs control such that, for example, various messages from the pseudo base station device 10 and the packet transmission rate calculated by the transmission rate calculating device 40 are displayed on a screen of the display unit 93.

The display unit 93 is, for example, a liquid crystal display and displays various messages from the pseudo base station device 10 and the packet transmission rate calculated by the transmission rate calculating device 40 under the control of the display control unit 92. The display unit 93 forms packet transmission rate display means according to the invention.

The test scenario storage device 94 stores a test scenario which is a test sequence for testing the mobile communication terminal 5. The pseudo base station device 10 and the virtual connection device 20 are controlled according to the test scenario. The parameter extracting unit 95 extracts each parameter described in the test scenario and transmits the extracted parameters to the parameter input unit 50.

Figure 5:
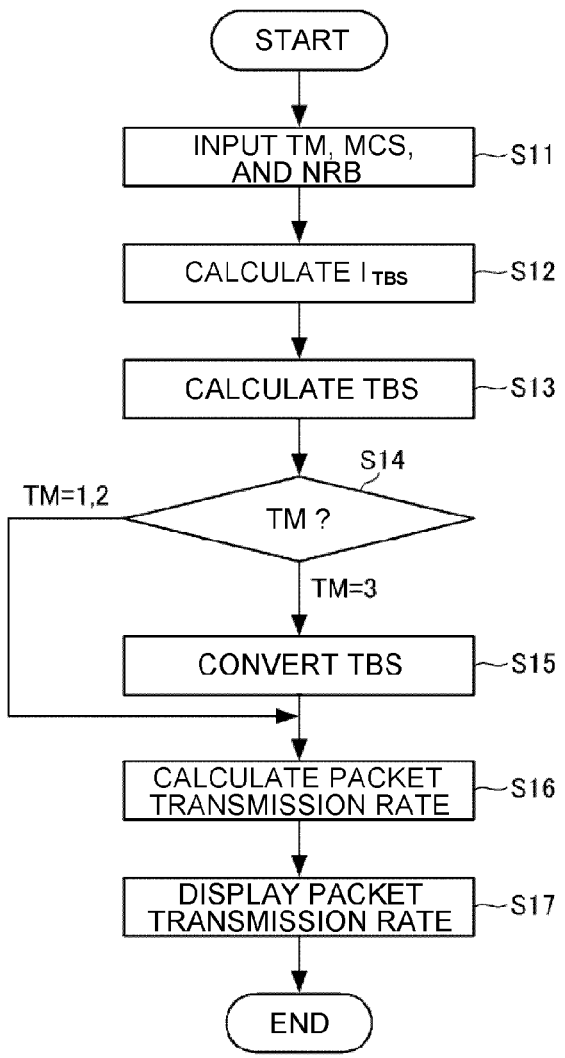
FIG. 5 is a flowchart illustrating the operation of the mobile communication terminal test device according to the first embodiment of the invention.

Next, the operation of the mobile communication terminal test device 1 according to this embodiment will be described with reference to the flowchart shown in FIG. 5.

Figure 6:
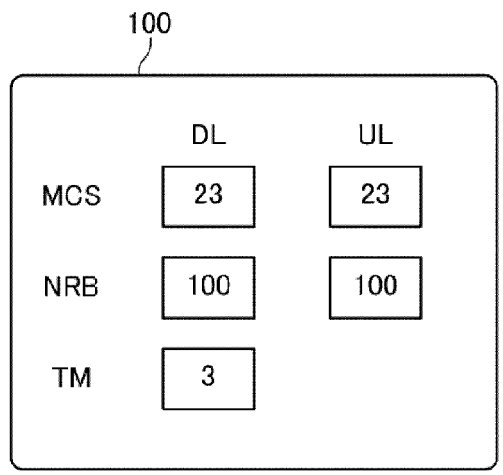
FIG. 6 is a diagram illustrating a GUI screen to which TM, MCS, and NRB are input in the mobile communication terminal test device according to the first embodiment of the invention.

The tester operates the operation unit 91 to input TM, MCS, and NRB (Step S11). It is assumed that, for example, a GUI screen 100 shown in FIG. 6 is used to input these data items. That is, the downlink will be described below assuming that MCS=23, NRB=100, and TM=3 are input to the GUI screen 100 in the downlink (DL) and MCS=23 and NRB=100 are input to the GUI screen 100 in the uplink (UL). These data items are input from the operation unit 91 to the parameter input unit 50. Specifically, the TM input unit 51 inputs TM=3, the MCS input unit 52 inputs MCS=23, and the NRB input unit 53 inputs NRB=100. The TM input unit 51, the MCS input unit 52, and the NRB input unit 53 form transmission mode information acquiring means, modulation and coding scheme information acquiring means, and resource block number information acquiring means according to the invention, respectively. The parameter input unit 50 may acquire each parameter from the parameter extracting unit 95. In this case, the parameter extracting unit 95 forms test condition input means according to the invention.

The TBS acquiring unit 41 calculates $I_{TBS}$ (Step S12). That is, the TBS acquiring unit 41 calculates $I_{TMS}$=21 corresponding to MCS=23 with reference to the index table 31 (see FIG. 2(a)).

In addition, the TBS acquiring unit 41 calculates TBS (Step S13). That is, the TBS acquiring unit 41 calculates TBS=51024 bits at NRB=100 corresponding to $I_{TBS}$=21 with reference to the TBS table 32 (see FIG. 3).

The TBS conversion unit 42 determines any one of TM=1, TM=2, and TM=3 on the basis of the information input by the TM input unit 51 (Step S14).

When it is determined in Step S14 that TM is 1 or TM is 2, the process proceeds to Step S16, which will be described below. On the other hand, when it is determined in Step S14 that TM is 3, the TBS conversion unit 42 converts TBS with reference to the TBS conversion table 33 (Step S15). In this embodiment, since it is assumed that TM is 3, the TBS conversion unit 42 converts TBS=51024 bits calculated in Step S13 into TBS=101840 bits with reference to the TBS conversion table 33 (see FIG. 4).

The packet transmission rate calculating unit 43 calculates the theoretical value of the packet transmission rate (Step S16). Specifically, the packet transmission rate calculating unit 43 converts TBS=101840 bits (maximum number of bits which can be transmitted at an interval of 10 milliseconds) calculated in Step S15 into a bit rate per second, thereby calculating the theoretical value of the packet transmission rate. That is, the packet transmission rate calculating unit 43 divides 101840 bits by 10 milliseconds to obtain 101.84 Mbps.

The transmission rate calculating device 40 transmits data for the calculated theoretical value of the packet transmission rate to the display control unit 92. The display control unit 92 displays various messages from the pseudo base station device 10 and the theoretical value of the packet transmission rate on the screen of the display unit 93 (Step S17).

Figures 7, 9:
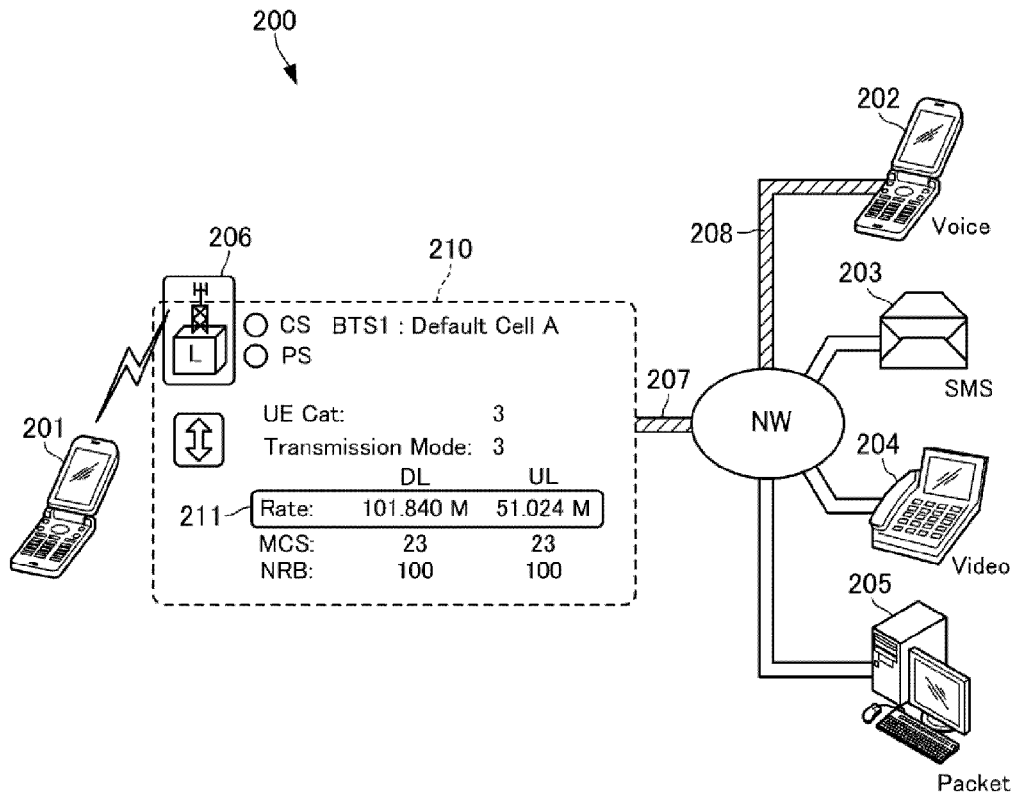
FIG. 7 is a diagram illustrating an example of a display screen in the mobile communication terminal test device according to the first embodiment of the invention.
FIG. 9 is a diagram illustrating a BWNRB table in the mobile communication terminal test device according to the second embodiment of the invention.

FIG. 7 is a diagram illustrating an example of the display screen displayed by the display unit 93. A display screen 200 includes an image 201 indicating the mobile communication terminal 5, which is a test target, an image 202 indicating the virtual mobile communication terminal 21, which is a communication partner, an image 206 indicating that both sides are communicating with each other using LTE, hatched transmission path lines 207 and 208 indicating that both sides are communicating with each other, and a communication state display portion 210 that displays a communication state between both sides. The theoretical value 211 of the packet transmission rate in the downlink which is calculated by the above-mentioned process is displayed in a "Rate" field of the communication state display portion 210. In addition, the display screen 200 includes images 203, 204, and 205 indicating the virtual SMS server 22, the virtual television phone 23, and the virtual network PC 24 which do not communicate, respectively.

As described above, the mobile communication terminal test device 1 according to this embodiment includes the parameter input unit 50 that inputs information about TM, MCS, and NRB, the packet transmission rate calculating unit 43 that calculates the theoretical value of the packet transmission rate on the basis of the information items, and the display unit 93 that displays the theoretical value of the packet transmission rate. Therefore, even when the mobile communication terminal is tested using the communication system whose MCS and NRB are determined according to transmission path conditions, it is possible to display the theoretical value of the packet transmission rate.

Second Embodiment

First, the structure of a mobile communication terminal test device according to a second embodiment of the invention will be described.

Figure 8:
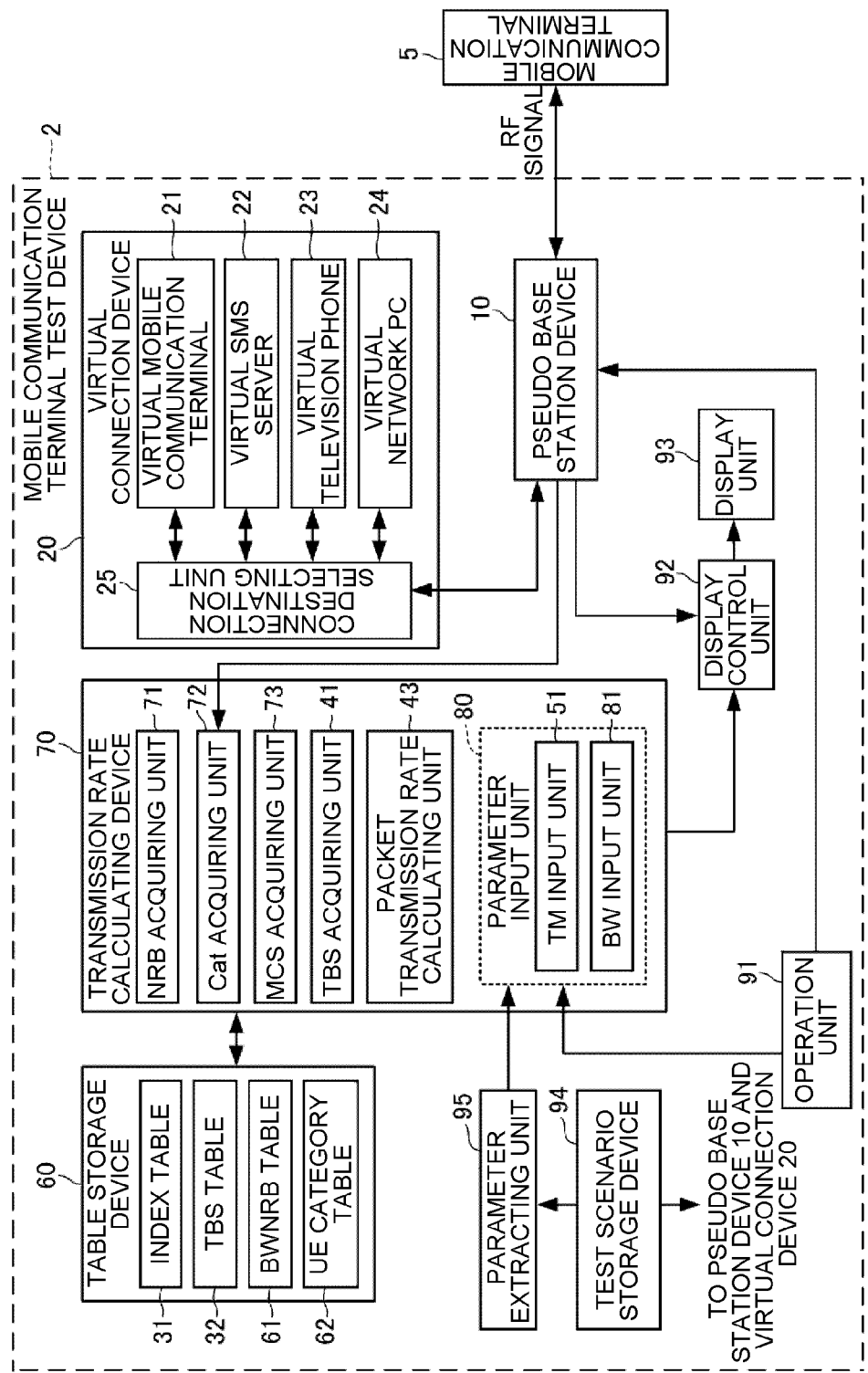
FIG. 8 is a block diagram illustrating the structure of a mobile communication terminal test device according to a second embodiment of the invention.

As shown in FIG. 8, a mobile communication terminal test device 2 according to this embodiment is obtained by changing a portion of the structure of the mobile communication terminal test device 1 (see FIG. 1) according to the first embodiment. Therefore, in the second embodiment, the difference from the first embodiment will be mainly described. In the second embodiment, the same components as those in the first embodiment are denoted by the same reference numerals and the description thereof will not be repeated. In this embodiment, an aspect in which the tester inputs information about TM and communication bandwidth (BW) to the mobile communication terminal test device 2 to test a mobile communication terminal 5 will be described.

The mobile communication terminal test device 2 according to this embodiment includes a table storage device 60 and a transmission rate calculating device 70.

The table storage device 60 stores an index table 31, a TBS table 32, a BWNRB table 61, and a UE category table 62. The table storage device 60 forms table storage means according to the invention.

The BWNRB table 61 indicates the correspondence between the communication bandwidth (BW) and the maximum number of resource blocks (NRB) which can be acquired. The BWNRB table 61 is described in the technical specification "3GPP TS 36.101" and is shown in FIG. 9.

As shown in FIG. 9, in the BWNRB table 61, the maximum value of NRB which can be acquired is associated with BW=1.4 MHz, 3 MHz, 5 MHz, 10 MHz, 15 MHz, and 20 MHz. For example, when BW is 20 MHz, the maximum value of NRB is 100.

The UE category table 62 indicates the correspondence between a terminal category indicating the communication capability of UE (User Equipment: mobile communication terminal) and the maximum value of NRB acquired at a transmission time interval (TTI). The terminal category is set for each mobile communication terminal in advance and can be acquired from the mobile communication terminal by communication. The UE category table 62 is described in the technical specification "3GPP TS 36.306" and is shown in FIG. 10.

In FIG. 10, FIG. 10(a) shows the UE category table of the downlink and FIG. 10(b) shows the UE category table of the uplink. In FIGS. 10(a) and 10(b), terminal categories 1 to 5 are defined.

In FIG. 10(a), the maximum value of TBS in TM3 in each terminal category is written in a field next to the terminal category field and the maximum value of TBS in TM1 or TM2 in each terminal category is written to a field next to the field. For example, when the terminal category is 3, the maximum value of TBS in TM3 is 102048 bits and the maximum value of TBS in TM1 or TM2 is 75376 bits.

The transmission rate calculating device 70 includes an NRB acquiring unit 71, a Cat acquiring unit 72, an MCS acquiring unit 73, and a parameter input unit 80.

The parameter input unit 80 includes a BW input unit 81 that inputs information about the communication bandwidth.

The NRB acquiring unit 71 acquires information about NRB from the information about the communication bandwidth input by the BW input unit 81, with reference to the BWNRB table 61. The NRB acquiring unit 71 forms resource block number information acquiring means according to the invention.

The Cat acquiring unit 72 acquires the terminal category information of the mobile communication terminal 5 through the pseudo base station device 10. The Cat acquiring unit 72 forms terminal category information acquiring means according to the invention.

The MCS acquiring unit 73 acquires MCS on the basis of TBS at NRB acquired by the NRB acquiring unit 71 and TBS at NRB which is calculated from the terminal category information of the mobile communication terminal 5 with reference to the UE category table 62. The MCS acquiring unit 73 forms modulation and coding scheme information acquiring means according to the invention.

Figure 11:
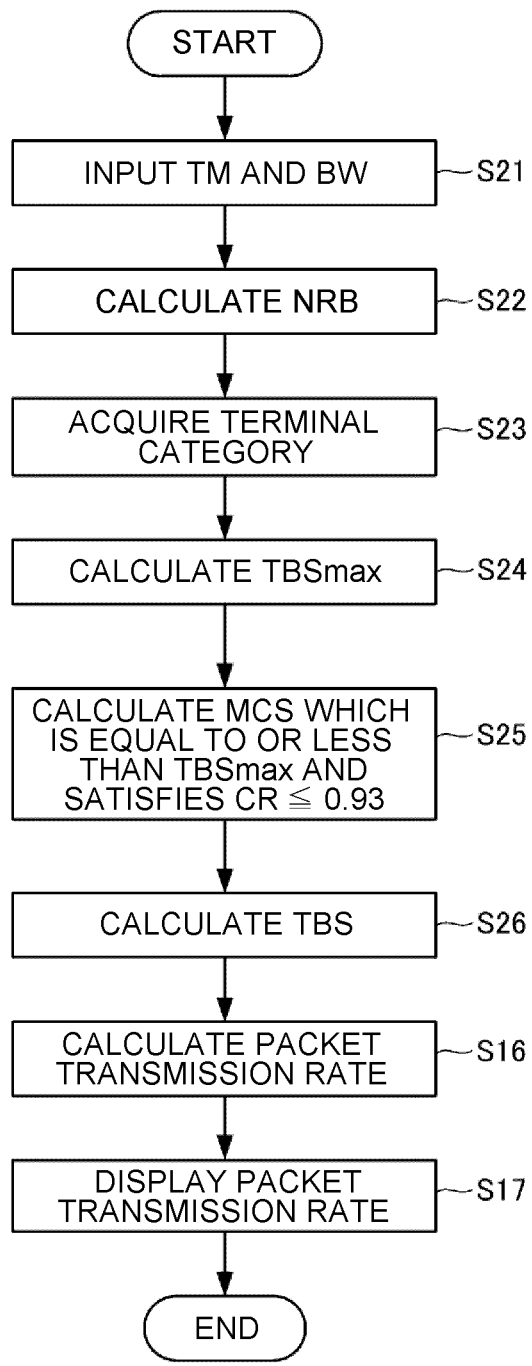
FIG. 11 is a flowchart illustrating the operation of the mobile communication terminal test device according to the second embodiment of the invention.

Next, the operation of the mobile communication terminal test device 2 according to this embodiment will be described with reference to the flowchart shown in FIG. 11.

The tester operates the operation unit 91 (or the parameter extracting unit 95 extracts parameters) to input TM and BW (Step S21). It is assumed that TM is 1 and BW is 20 MHz.

The NRB acquiring unit 71 calculates NRB with reference to the BWNRB table 61 (Step S22). Specifically, the NRB acquiring unit 71 acquires NRB=100 at BW=20 MHz with reference to the BWNRB table 61.

The TBS acquiring unit 41 acquires a maximum TBS (hereinafter, referred to as a "first TBS")=75376 bits at NRB=100 with reference to the TBS table 32 (see FIG. 3).

The Cat acquiring unit 72 acquires the terminal category information of the mobile communication terminal 5 through the pseudo base station device 10 (Step S23). It is assumed that the terminal category acquired in Step 23 is 3.

The TBS acquiring unit 41 acquires TBS (hereinafter, referred to as a "second TBS")=75376 bits under the conditions of TM=1 input in Step S21 and the terminal category=3 with reference to the UE category table 62.

The TBS acquiring unit 41 compares the first TBS and the second TBS and calculates the smaller (hereinafter, referred to as "TBSmax") of the first TBS and the second TBS (Step S24). In the above-mentioned example, since the first TBS and the second TBS are equal to each other and are 75376 bits, TBSmax is 75376 bits.

The MCS acquiring unit 73 calculates MCS which is equal to or less than TBSmax and satisfies the relationship CR (code rate)≤0.93 (Step S25). Here, since CR indicates the coding rate during packet transmission, it is calculated from three parameters, that is, MCS, NRB, and CFI (Control Format Indicator) by the computation expression described in the technical specification "3GPP TS 36.213". That is, the code rate is calculated as follows: CR=TBS/RE (Resource Element). RE is a unit of resource and a set of REs is a resource block. TBS is determined on the basis of MCS and NRB and RE is determined on the basis of CFI. As a result of the calculation of MCR which is equal to or less than TBSmax=75376 bits and satisfies CR≤0.93, MCS=27 and CR=0.837 are obtained.

The TBS acquiring unit 41 calculates $I_{TBS}=25$ corresponding to MCS=27 with reference to the index table 31 (see FIG. 2(a)).

The TBS acquiring unit 41 calculates TBS=63776 bits at the intersection of $I_{TBS}=25$ and NRB=100 with reference to the TBS table 32 (Step S26).

The packet transmission rate calculating unit 43 calculates the theoretical value of the packet transmission rate (Step S16). Specifically, the packet transmission rate calculating unit 43 converts TBS=63776 bits (a transmission value for 10 milliseconds) calculated in Step S26 into a bit rate per second, thereby calculating the theoretical value of the packet transmission rate. That is, the packet transmission rate calculating unit 43 divides 63776 bits by 10 milliseconds to obtain 63.776 Mbps.

The transmission rate calculating device 40 transmits data for the calculated theoretical value of the packet transmission rate to the display control unit 92. The display control unit 92 displays various messages from the pseudo base station device 10 and the theoretical value of the packet transmission rate on the screen of the display unit 93 (Step S17).

As described above, the mobile communication terminal test device 2 according to this embodiment includes the parameter input unit 80 that inputs information about TM and BW, the packet transmission rate calculating unit 43 that calculates the theoretical value of the packet transmission rate on the basis of the information, and the display unit 93 that displays the theoretical value of the packet transmission rate. Therefore, even when the mobile communication terminal is tested using the communication system whose MCS and NRB are determined according to transmission path conditions, it is possible to display the theoretical value of the packet transmission rate.

INDUSTRIAL APPLICABILITY

As described above, the mobile communication terminal test device and the mobile communication terminal test method according to the invention can display the theoretical value of the packet transmission rate and are useful as a mobile communication terminal test device and a mobile communication terminal test method which test mobile communication terminals, such as mobile phones or mobile terminals, using a communication system whose MCS and NRB are determined according to transmission path conditions.

DESCRIPTION OF REFERENCE NUMERALS AND SIGNS 1, 2: MOBILE COMMUNICATION TERMINAL TEST DEVICE
5: MOBILE COMMUNICATION TERMINAL
10: PSEUDO BASE STATION DEVICE
20: VIRTUAL CONNECTION DEVICE
21: VIRTUAL MOBILE COMMUNICATION TERMINAL
22: VIRTUAL SMS SERVER
23: VIRTUAL TELEVISION PHONE
24: VIRTUAL NETWORK PC
25: CONNECTION DESTINATION SELECTING UNIT
30, 60: TABLE STORAGE DEVICE (TABLE STORAGE MEANS)
31: INDEX TABLE
32: TBS TABLE (TRANSPORT BLOCK SIZE TABLE)
33: TBS CONVERSION TABLE
40, 70: TRANSMISSION RATE CALCULATING DEVICE
41: TBS ACQUIRING UNIT (TRANSPORT BLOCK SIZE ACQUIRING MEANS)
42: TBS CONVERSION UNIT
43: PACKET TRANSMISSION RATE CALCULATING UNIT (PACKET TRANSMISSION RATE CALCULATING MEANS)
50, 80: PARAMETER INPUT UNIT
51: TM INPUT UNIT (TRANSMISSION MODE INFORMATION ACQUIRING MEANS)
52: MCS INPUT UNIT (MODULATION AND CODING SCHEME INFORMATION ACQUIRING MEANS)

53: NRB INPUT UNIT (THE NUMBER OF RESOURCE BLOCKS INFORMATION ACQUIRING MEANS)
61: BWNRB TABLE
62: UE CATEGORY TABLE
71: NRB ACQUIRING UNIT (THE NUMBER OF RESOURCE BLOCKS INFORMATION ACQUIRING MEANS)
72: Cat ACQUIRING UNIT (TERMINAL CATEGORY INFORMATION ACQUIRING MEANS)
73: MCS ACQUIRING UNIT (MODULATION AND CODING SCHEME INFORMATION ACQUIRING MEANS)
81: BW INPUT UNIT
91: OPERATION UNIT (TEST CONDITION INPUT MEANS)
92: DISPLAY CONTROL UNIT
93: DISPLAY UNIT (PACKET TRANSMISSION RATE DISPLAY MEANS)
94: TEST SCENARIO STORAGE DEVICE
95: PARAMETER EXTRACTING UNIT (TEST CONDITION INPUT MEANS)
100: GUI SCREEN
200: DISPLAY SCREEN
201 TO 206: IMAGE
207: TRANSMISSION PATH LINE
210: COMMUNICATION STATE DISPLAY UNIT
211: THEORETICAL VALUE OF PACKET TRANSMISSION RATE

The invention claimed is:

1. A mobile communication terminal test device that tests a mobile communication terminal which performs communication using a communication system in which a modulation and coding scheme (MCS) and the number of resource blocks (NRB) determined according to transmission path conditions and a transmission mode (TM) indicating a predetermined packet transmission operation mode are prescribed in a test scenario, comprising:
    modulation and coding scheme information acquiring means for acquiring information about the modulation and coding scheme;
    resource block number information acquiring means for acquiring information about the number of resource blocks;
    transmission mode information acquiring means for acquiring information about the transmission mode;
    transport block size acquiring means for acquiring a maximum transport block size (TBS) transmission per unit time from the information about the modulation and coding scheme, the information about the number of resource blocks, and the information about the transmission mode;
    packet transmission rate calculating means for calculating a theoretical value of a packet transmission rate from the transport block size; and
    packet transmission rate display means for displaying the theoretical value of the packet transmission rate.

2. The mobile communication terminal test device according to claim 1, further comprising:
    test condition input means for inputting test conditions including the information about the modulation and coding scheme, the information about the number of resource blocks, and the information about the transmission mode; and
    table storage means for storing a transport block size table indicating a correspondence between the modulation and coding scheme and the transport block size,
    wherein the modulation and coding scheme information acquiring means, the resource block number information acquiring means, and the transmission mode information acquiring means acquire the information about the modulation and coding scheme, the information about the number of resource blocks, and the information about the transmission mode which are input by the test condition input means, respectively, and
    the transport block size acquiring means acquires the transport block size from the information about the modulation and coding scheme, the information about the number of resource blocks, and the information about the transmission mode which are input by the test condition input means, and the transport block size table.

3. The mobile communication terminal test device according to claim 2, further comprising:
    test scenario storage means for storing the test scenario which is a test sequence for testing the mobile communication terminal,
    wherein the test condition input means extracts the information about the modulation and coding scheme, the information about the number of resource blocks, and the information about the transmission mode from the test scenario stored in the test scenario storage means.

4. The mobile communication terminal test device according to claim 1, further comprising:
    test condition input means for inputting test conditions including information about a communication bandwidth (BW) of the mobile communication terminal and information about the transmission mode;
    terminal category information acquiring means for acquiring terminal category information indicating a communication capability of the mobile communication terminal from the mobile communication terminal; and
    table storage means for storing a transport block size table indicating a correspondence between the modulation and coding scheme and the transport block size,
    wherein the transmission mode information acquiring means acquires the information about the transmission mode, which is input by the test condition input means,
    the modulation and coding scheme information acquiring means acquires the information about the modulation and coding scheme on the basis of a smaller one of: a first maximum number of transport blocks, which are acquired in the communication bandwidth, and a second maximum number of transport blocks, which are acquired in a terminal category, and
    the transport block size acquiring means acquires the transport block size on the basis of the information about the modulation and coding scheme acquired by the modulation and coding scheme information acquiring means and the transport block size table.

5. The mobile communication terminal test device according to claim 4, further comprising:
    test scenario storage means for storing the test scenario which is a test sequence for testing the mobile communication terminal,
    wherein the test condition input means extracts the information about the communication bandwidth and the information about the transmission mode from the test scenario stored in the test scenario storage means.

6. A mobile communication terminal test method that tests a mobile communication terminal which performs communication using a communication system in which a modulation and coding scheme (MCS) and the number of resource blocks (NRB) determined according to transmission path conditions and a transmission mode (TM) indicating a predetermined packet transmission operation mode are prescribed in a test scenario, comprising:
- a modulation and coding scheme information acquiring step of acquiring information about the modulation and coding scheme;
- a resource block number information acquiring step of acquiring information about the number of resource blocks;
- a transmission mode information acquiring step of acquiring information about the transmission mode;
- a transport block size acquiring step of acquiring a maximum transport block size (TBS) transmission per unit time from the information about the modulation and coding scheme, the information about the number of resource blocks, and the information about the transmission mode;
- a packet transmission rate calculating step of calculating a theoretical value of a packet transmission rate from the transport block size; and
- a packet transmission rate display step of displaying the theoretical value of the packet transmission rate,
- wherein the steps are performed by a mobile communication terminal test device that tests the mobile communication terminal.

7. The mobile communication terminal test method according to claim 6, further comprising:
- a test condition input step of inputting test conditions including the information about the modulation and coding scheme, the information about the number of resource blocks, and the information about the transmission mode,
- wherein the modulation and coding scheme information acquiring step, the resource block number information acquiring step, and the transmission mode information acquiring step acquire the information about the modulation and coding scheme, the information about the number of resource blocks, and the information about the transmission mode which are input in the test condition input step, respectively, and
- the transport block size acquiring step acquires the transport block size from the information about the modulation and coding scheme, the information about the number of resource blocks, and the information about the transmission mode which are input in the test condition input step, and a transport block size table indicating a correspondence between the modulation and coding scheme and the transport block size.

8. The mobile communication terminal test method according to claim 7, further comprising:
- a test scenario storage step of storing the test scenario which is a test sequence for testing the mobile communication terminal,
- wherein the test condition input step extracts the information about the modulation and coding scheme, the information about the number of resource blocks, and the information about the transmission mode from the stored test scenario.

9. The mobile communication terminal test method according to claim 6, further comprising:
- a test condition input step of inputting test conditions including information about a communication bandwidth (BW) of the mobile communication terminal and information about the transmission mode; and
- a terminal category information acquiring step of acquiring terminal category information indicating a communication capability of the mobile communication terminal from the mobile communication terminal,
- wherein the transmission mode information acquiring step acquires the information about the transmission mode, which is input in the test condition input step,
- the modulation and coding scheme information acquiring step acquires the information about the modulation and coding scheme on the basis of the smaller of a smaller one of: a first maximum number of transport blocks, which are acquired in the communication bandwidth, and a second maximum number of transport blocks, which are acquired in a terminal category, and
- the transport block size acquiring step acquires the transport block size on the basis of the information about the modulation and coding scheme acquired in the modulation and coding scheme information acquiring step and a transport block size table indicating a correspondence between the modulation and coding scheme and the transport block size.

10. The mobile communication terminal test device according to claim 9, further comprising:
- a test scenario storage step of storing the test scenario which is a test sequence for testing the mobile communication terminal,
- wherein the test condition input step extracts the information about the communication bandwidth and the information about the transmission mode from the stored test scenario.

* * * * *